United States Patent
Venkataramanan et al.

(10) Patent No.: US 9,582,286 B2
(45) Date of Patent: Feb. 28, 2017

(54) REGISTER FILE MANAGEMENT FOR OPERATIONS USING A SINGLE PHYSICAL REGISTER FOR BOTH SOURCE AND RESULT

(71) Applicant: Advanced Micro Devices, Inc., Sunnyvale, CA (US)

(72) Inventors: Ganesh Venkataramanan, Sunnyvale, CA (US); Debjit Das Sarma, San Jose, CA (US); Betty A. McDaniel, Austin, TX (US); Gregory W. Smaus, Austin, TX (US); Francesco Spadini, Sunset Valley, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1016 days.

(21) Appl. No.: 13/673,350

(22) Filed: Nov. 9, 2012

(65) Prior Publication Data
US 2014/0136819 A1 May 15, 2014

(51) Int. Cl.
*G06F 9/30* (2006.01)
*G06F 9/44* (2006.01)
*G06F 9/38* (2006.01)

(52) U.S. Cl.
CPC ........ *G06F 9/3857* (2013.01); *G06F 9/30043* (2013.01); *G06F 9/384* (2013.01); *G06F 9/3826* (2013.01)

(58) Field of Classification Search
CPC .............................. G06F 9/384; G06F 12/084
See application file for complete search history.

(56) References Cited

U.S. PATENT DOCUMENTS

| | | | | |
|---|---|---|---|---|
| 2002/0144090 | A1* | 10/2002 | Ronen et al. | 712/217 |
| 2003/0038665 | A1* | 2/2003 | Naven | 327/298 |
| 2004/0081186 | A1* | 4/2004 | Warren et al. | 370/419 |
| 2004/0085994 | A1* | 5/2004 | Warren et al. | 370/462 |
| 2008/0222414 | A1* | 9/2008 | Wang et al. | 713/161 |

OTHER PUBLICATIONS

Monreal et al., Dynamic Register Renaming Through Virtual-Physical Reisters, May 2000.*
The Journal of Instruction—Level Parallelis, vol. 2, Circa 2000.*

* cited by examiner

*Primary Examiner* — Hyun Nam

(57) ABSTRACT

A processor includes a physical register file having physical registers and an execution unit to perform an arithmetic operation to generate a result mapped to a physical register, wherein the processor delays a write of the result to the physical register file until the result is qualified as valid. A method includes mapping the same physical register both to store load data of a load-execute operation and to subsequently store a result of an arithmetic operation of the load-execute operation, and writing the load data into the physical register. The method further includes, in a first clock cycle, executing the arithmetic operation to generate the result, and, in a second clock cycle, providing the result as a source operand for a dependent operation. The method includes, in a third clock cycle, enabling a write of the result to the physical register file responsive to the result qualifying as valid.

19 Claims, 6 Drawing Sheets

REGISTER FILE MANAGEMENT FOR OPERATIONS USING A SINGLE PHYSICAL REGISTER FOR BOTH SOURCE AND RESULT

BACKGROUND

Field of the Disclosure

The present disclosure generally relates to pipelined instruction execution in a processing device and, more particularly, to register file management during pipelined instruction execution.

Description of the Related Art

Register renaming often is used in pipelined processor architectures so as to dynamically map architected registers to a set of physical registers. As only a subset of architected registers are in use by the processor at any given time, register renaming typically allows the architected register set to be represented by a smaller set of physical registers, thereby saving the power and area that otherwise would be needed for a one-to-one mapping between physical registers and architected registers. However, in certain circumstances, there may be more architected registers in use in a processor than there are physical registers in the processor, thereby requiring the processor to stall until one or more physical registers are released for mapping to unmapped architected registers.

BRIEF DESCRIPTION OF THE DRAWINGS

The present disclosure may be better understood, and its numerous features and advantages made apparent to those skilled in the art by referencing the accompanying drawings. The use of the same reference numbers in different drawings indicates similar or identical items.

DETAILED DESCRIPTION

Figure 1:
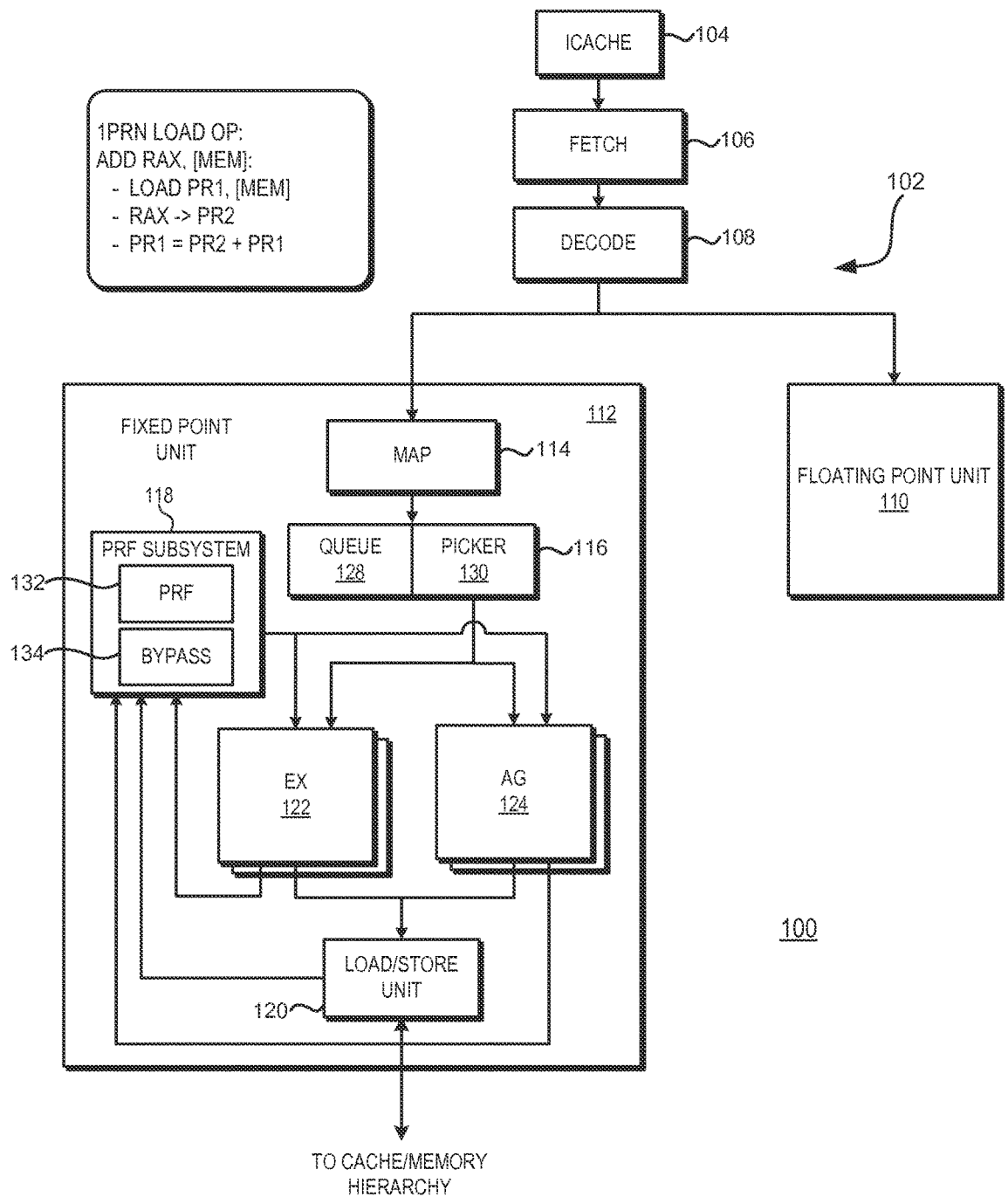
FIG. 1 is a block diagram illustrating a pipeline of a processor in accordance with some embodiments.

FIGS. 1-6 illustrate example techniques for executing load-execute operations using a single physical register as both a source register and the result, or destination, register in accordance with some embodiments. The term load-execute operation, as used herein, refers to an instruction or other operation that includes a load operation that loads data into a source register and an arithmetic operation or other execute operation that uses the load data in the source register as a source operand in generating a result. The execute operation also may make use of one or more other source operands from other source registers, make use of one or more immediate values or displacement values as source operands, and the like. For example, in a microcoded instruction set architecture, the load-execute operation:

ADD rax[mem]

could map into the following set of micro-operations (uOps):

$Pr1=[mem]$(load the value at memory address mem into $Pr1$)     (1)

$Pr3=Pr2+Pr1$(addition operation of rax and [mem])     (2)

whereby Pr1, Pr2, and Pr3 are separate physical registers and rax is an architected register previously mapped to physical register Pr2.

In order to save a physical register, the same physical register Pr1 can be used to both load the source operand [mem] and as the destination of the addition operation, such that the instruction instead decodes and is register renamed to the following set of uOps:

$Pr1=[mem]$(load the value at memory address mem into $Pr1$)     (1)

$Pr1=Pr2+Pr1$(addition operation of rax and [mem])     (2)

However, it often is imperative that the source data stored in the destination physical register not be overwritten by a speculative result. Such a scenario can have disastrous implications as the operation that provided the source data may have retired or is otherwise unavailable, in which case it typically is difficult or impossible to recover the source data again, and thus makes it difficult or impossible to replay the operation stream leading up to the error. To help ensure this does not occur, it typically is necessary to qualify the result write to the physical register with the validity status of the result. Therefore, it may be necessary to delay the result write one or more cycles dependent on the availability of the validity status of the result.

Accordingly, in some embodiments, rather than write the result to the destination register upon calculation of the result (and thus overwrite the load data in that same register), the write of the result to the destination register in the physical register file is delayed until the validity status of the result is known. If the result is qualified as valid data (that is, the result is "good data"), the write of the result to the physical register file is permitted to proceed. Otherwise, if the result is qualified as invalid (that is, the result is "bad data"), the write to the physical register file is terminated or otherwise continues to be suppressed and the pipeline can take action to address the invalid result issue, such as by replaying a certain number of preceding operations in the program order of the software being executed by the processor.

As subsequent operations may depend on the result, the result of the load-execute operation can be made available to such dependent operations through a register bypass network while the validity status is being ascertained. As it may take more than one cycle after the result is calculated before the validity status of the result is known, the register bypass network can implement a series of N bypass levels so that the result can be made available to dependent operations for multiple clock cycles following its calculation and while waiting to be written into the physical register file. In this manner, the same physical register can be used both to load operand data from a memory hierarchy for a load-execute operation and to store the result of the load-execute operation without the risk of the load data being overwritten with a bad result.

FIG. 1 illustrates a processor core 100 of a processor having an execution pipeline 102 that implements the same physical register for both the result and a source operand for load-execute operations in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the processor core 100 includes an instruction cache 104, a fetch unit 106, a decode unit 108, one or more floating point units 110, and one or more fixed point units 112 (also commonly referred to as "integer execution units"). The instruction cache 104 stores instruction data which is fetched by the fetch unit 106 in response to demand fetch operations (e.g., a fetch to request the next instruction in an instruction stream identified by a program counter) or in response to speculative prefetch operations. The decode unit 108 decodes instructions fetched by the fetch unit 106 into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The fixed point unit 112 includes a map unit 114, a scheduler unit 116, a physical register file (PRF) subsystem 118, a load/store unit (LSU) 120, and one or more execution (EX) units 122, such as one or more arithmetic logic units (ALUs), and one or more address generation (AG) units 124. The LSU 120 is connected to a memory hierarchy, including one or more levels of cache (e.g., L1 cache, L2, cache, etc.), a system memory, such as system RAM, and one or more mass storage devices, such as a solid-state drive (SSD) or an optical drive. The scheduler unit 116 includes a scheduler queue 128 and a picker 130. The PRF subsystem 118 includes a physical register file (PRF) 132 and a register bypass network 134. The PRF 132 comprises a set of physical registers implemented as, for example, static random access memory (SRAM) with multiple read and write ports. The register bypass network 134 comprises multiplexers and other logic that allow the execution units to access certain register values and other operands already being processed without performing reads to the PRF 132. An example implementation of the PRF subsystem 118 is described below in greater detail with reference to FIG. 2.

In an operation of the fixed point unit 112, the map unit 114 receives operations from the decode unit 108 (usually in the form of operation codes, or opcodes). These dispatched operations typically also include, or reference, associated information used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used the operation, and a destination field that identifies the physical register in which the result of the execution of the corresponding operation is to be stored.

Prior to storing an operation in the scheduler queue 128, the map unit 114 performs register renaming whereby external operand names (that is, architected register names (ARNs)) are translated into internal operand names (that is, physical register names (PRNs)). This renaming process includes the map unit 114 evaluating a subset of operations including the operation to be queued to identify any dependencies between sources and destinations associated with the operations, and then mapping architected registers to physical registers so as to avoid false dependencies and facilitate parallel execution of independent operations as using register renaming techniques known in the art.

In some embodiments, the register renaming process performed by the map unit 114 includes mapping the architected registers for a load-execute operation such that the source register used to store the load data and the destination register used to store the result of the corresponding execute operation are mapped to the same PRN. Using the example load-execute operation ADD rax, [mem] described above, and assuming the architected register rax is mapped to physical register Pr2, the decode unit 108 would decode this operation into two uOps:

$$\text{Load } Pr1,[\text{mem}] \qquad (1)$$

$$Pr3 = Pr2 + Pr1 \qquad (2)$$

To eliminate the use of a physical register as a temporary register for the load operation, and thus freeing the physical register for use by other operations, the map unit 114 can map the destination register of the add operation, the destination register of the load operation, and the source register for [mem] in the add operation to the same physical register Pr1 so that the two uOps above are converted to the following two uOps stored in the scheduler queue 128:

$$\text{Load } Pr1,[\text{mem}] \qquad (1)$$

$$Pr1 = Pr2 + Pr1 \qquad (2)$$

and thus avoiding the need to use physical register Pr3 during the execution of this operation.

The picker 130 monitors the scheduler queue 128 to identify operations ready for execution, and upon picking an available operation and verifying its operands are ready and available, dispatches the operation to an EX unit or an AG unit. Operations requiring retrieval or storage of data, such as load, store, and load/store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The address generation operations performed by the AG units 124 and the execute operations performed by the EX units 122 typically utilize operand data, in the form of one or both of operands stored in source registers immediate/displacement values. The immediate/displacement value used during execution of an operation is dispatched to the EX/AG unit along with the operation from the scheduler queue 128. The source operands stored in the physical registers are read from the PRF subsystem 118 and provided to the corresponding EX/AG unit for use in executing the operation. Typically, these source operands are obtained by initiating a PRF read to the PRF 132. However, in certain situations, a source operand may be available from the register bypass network 134, and in such circumstances the source operand is provided by the register bypass network 134 and the PRF read is suppressed.

Load operations performed by the AG unit 124/LSU 120 and execute operations performed by the EX unit 122 result in data that is to be stored in the physical register identified as the destination of the load operation or execute operation. Accordingly, each of the EX unit 122 and the LSU 120, upon generating a result (either by completing an arithmetic operation or other execute operation for the EX unit 122 or by loading data from the memory hierarchy for the LSU 120), initiates a PRF write to the PRF 132 to store the result to the corresponding physical register identified as the destination register for the result. PRF writes initiated by the LSU 120 are permitted to complete without delay. However, rather than immediately completing a PRF write initiated by the EX unit 122, and thereby overwriting the data that was stored in the identified destination physical register, the PRF subsystem 118 delays completion of the PRF write initiated by the EX unit until the status (that is, good/bad or valid/invalid) of the result is available. If the status of the result is signaled as valid/good, the PRF write is permitted to complete. Otherwise, if the status of the result is signaled as invalid/bad, the PRF write is suppressed. Further, in the event of an invalid result, the fixed point unit 112 may replay a set of preceding operations in an attempt to arrive at a valid result and then continue from the same point.

The delay in completing the PRF write until the result of an execute operation has confirmed valid status permits the use of the same physical register to be used as both the source register for the load data and the destination register of the result of a load-execute operation while avoiding the potential for the load data being overwritten with an invalid result. Moreover, this delayed PRF write approach can reduce power by preventing PRF writes of invalid data for any execute operation, and thus avoiding the time- and power-consuming replay process. Examples of the execution of a load-execute operation using delayed PRF write are described below with reference to FIGS. 4 and 5.

Figure 2:
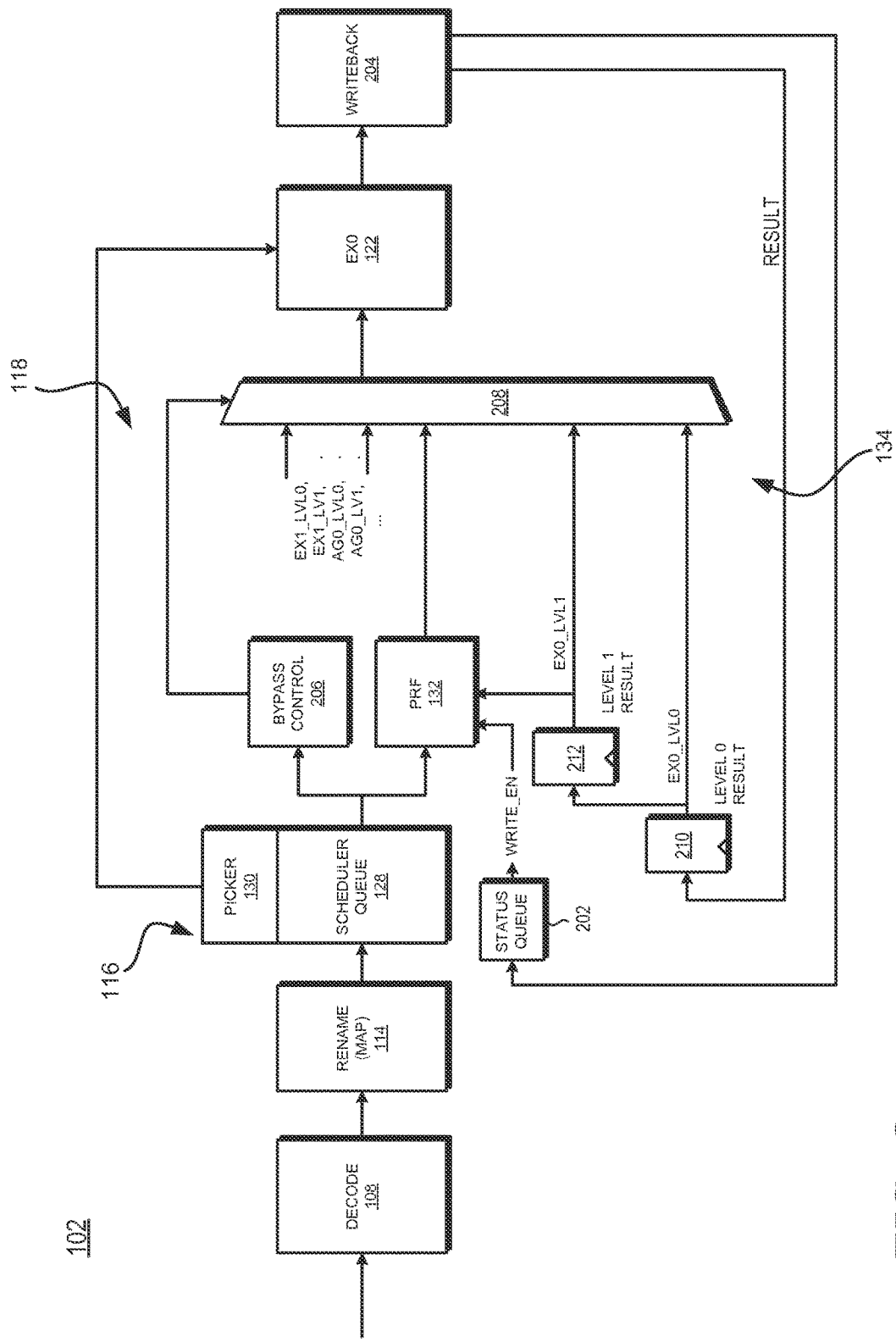
FIG. 2 is a block diagram illustrating a portion of the pipeline of FIG. 1 in greater detail in accordance with some embodiments.

FIG. 2 illustrates an example implementation of the PRF subsystem 118 in the execution pipeline 102 of FIG. 1 in accordance with some embodiments. As noted above, the execution pipeline 102 includes the decode unit 108, the map unit 114, the scheduler unit 116 (including the scheduler queue 128 and the picker 130), the PRF subsystem 118 (including the PRF 132 and the register bypass network 134), and one of the EX units 122 (designated "EX0" in FIG. 2). The pipeline further includes a status queue 202 and a writeback unit 204.

As noted above, PRF writes for results generated from execute operations are delayed N cycles until the results are qualified as valid data. In some embodiments, the status of a PRF write may take one or more additional cycles (that is, N>=1) before it is available. In such instances, the results are buffered and made available for bypass until the PRF write can complete and its status is available. To achieve this buffering and bypass ability, each EX unit 122 and each AG unit 124 includes one or more levels, or stages, of bypass latches to store the result generated during one or more previous cycles, whereby the number of levels of bypass latches corresponds to the number of cycles between when a result is generated and when it is qualified, and thus able to be written to the PRF 132 as described above. In the particular example of FIG. 2, the result is qualified in the next cycle after generation, and thus two cycles (N=2) of buffering are needed to maintain the result before it is written into the PRF write (assuming it qualifies as valid data). However, a similar approach may be implemented for one cycle of buffering, or for more than two cycles of buffering, or no buffering may be used if the status result is available by the end of the PRF write cycle.

FIG. 2 depicts the EX unit 122 as being associated with a level 0 bypass latch 210 to store the result from an operation performed during cycle n−1 (if any) and a level 1 bypass latch 212 to store the result from an operation performed during cycle n−2 (if any), whereby cycle n is the current cycle in this example. In this example, a result of an execute operation calculated during one cycle is output by the writeback unit 204 and buffered by the level 0 bypass latch 210. At the next cycle, this result is transferred to the level 1 bypass latch 212 and the result calculated by the EX unit 122 during this next cycle (if any) is output by the writeback unit 204 and buffered in the level 0 bypass latch 210. As such, results of execute operations performed by the EX unit 122 sequence first to the level 0 bypass latch 210 and then to the level 1 bypass latch 212 in the next cycle, and so on. The other EX units 122 and the AG units 124 likewise have the same level 0/level 1 bypass arrangement for the results of their execute operations and AG operations.

The outputs of the level 1 bypass latches 212 of the EX units 122 and the AG units 124 are connected to corresponding write ports of the PRF 132. In some embodiments, an identifier of the destination physical register for the result is latched with the data at the bypass latches 210 and 212, and thus the physical register of the PRF 132 to which the latched result is to be written to can be identified from the signaling provided by the level 1 bypass latch 212. In some embodiments, a bypass controller 206 maintains a queue or other data structure that identifies the destination physical registers for the results latched at the level 1 bypass latches 212, and the bypass controller 206 thus directs the write of result latched at a level 1 bypass latch 212 to the corresponding destination physical register using this information. In either configuration, a PRF write using the latched result at a level 1 bypass latch 212 is performed in response to an assertion of a write enable signal WRITE_EN associated with the corresponding write port of the PRF 132. As described in greater detail herein, the status queue 202 implements logic that maintains the write enable signal WRITE_EN in a deasserted state until the status for the result is available and indicates the result is valid data, in response to which the status queue 202 asserts the write enable signal WRITE_EN, and thus permitting the PRF write of the result to the identified physical register of the PRF 132.

Because there is an additional cycle of delay before result from an execute operation can be written to the PRF 132 in the example of FIG. 2, the result can be made available by the register bypass network 134 to EX units 122 or AG units 124 for use in executing operations dependent on the result (that is, having a source operand that references the result)

for two cycles in this example. To this end, the register bypass network 134 includes the bypass controller 206, the level 0 bypass latches 210 and the level 1 bypass latches 212 of the EX units 122 and the AG units 124, and a multiplexer 208. The multiplexer 208 includes inputs coupled to the read ports of the PRF 132, inputs coupled to the outputs of the bypass latches 210 and 212, and one or more outputs connected to the EX units 122 and the AG units 124. The multiplexer 208 further includes a select input to receive select signaling from the bypass controller 206 to control which input is provided as an output to the corresponding EX unit or AG unit.

In operation, the bypass controller 206 receives an input from the scheduler queue 128, which presents the sources and destinations of an operation and controls the multiplexer 208 to route data received at the inputs to the appropriate EX/AG unit. In some instances whereby the data needed as a source operand is not available in the register bypass network 134, a PRF read is initiated to obtain the source operand from the corresponding physical register of the PRF 132 and the bypass controller 206 controls the multiplexer 208 to provide the data at the appropriate read port of the PRF 132 to the EX/AG unit needing this source operand. However, in other instances, the data needed as a source operand may have been a result calculated within the previous two cycles and thus available in the register bypass network 134. Accordingly, the bypass controller 206 compares the destination PRNs of operations executed in cycle N−1 and N against the source PRNs of operations executed in cycle N+1. If one of the source PRNs needed in cycle N+1 matches any of the destination PRNs produced in either of the two previous cycles, the PRF read initiated for the source PRN is suppressed and the bypass controller 206 configures the select signaling to route the result from cycle N or cycle N−1 that is needed as source data in cycle N+1 from the appropriate input of the multiplexer 208 to the appropriate output of the multiplexer to deliver the needed data to the corresponding unit.

Figure 3:
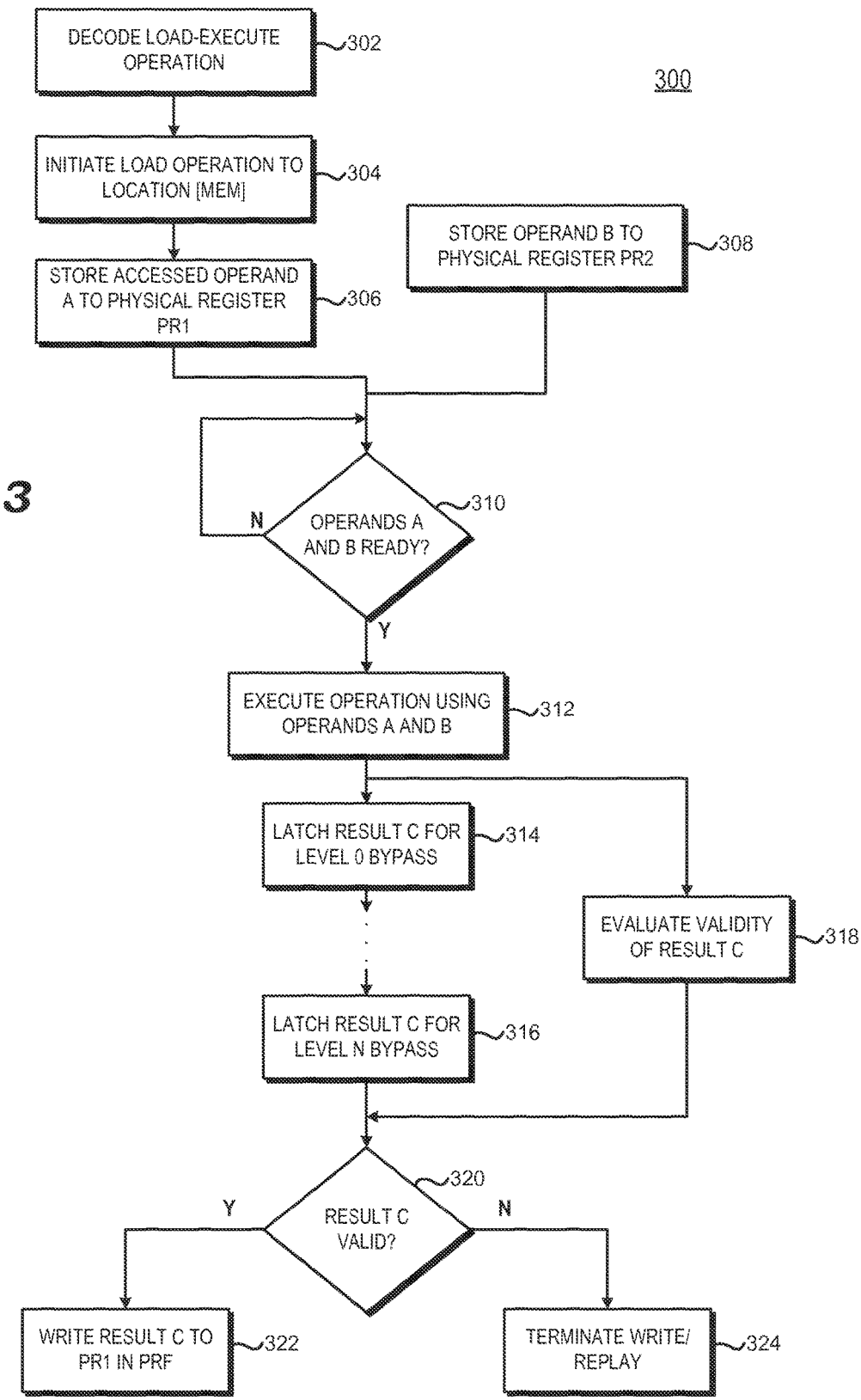
FIG. 3 is a flow diagram illustrating a method for executing a load-execute operation using a single physical register in accordance with some embodiments.

FIG. 3 illustrates an example method 300 of operation of the pipeline 102 for delayed PRF writes so as to enable the use of a single physical register as both load register and destination register for a load-execute operation in accordance with some embodiments. For ease of description, the method 300 is described in the example context of FIGS. 1 and 2. The method 300 initiates at block 302, whereupon the decode unit 108 receives and decodes a load-execute instruction to generate a load operation to load data from memory address [mem] in the memory hierarchy and an execute operation that uses the load data as a source operand, denoted herein as source operand A. In response, at block 304 the load operation is dispatched to an AG unit 124 to initiate the load operation. At block 306, the result of the load operation, the load data, is stored to a physical register Pr1 of the PRF 132.

At some point, another source operand used in the execute operation, referred to herein as source operand B, is stored to a physical register Pr2 of the PRF 132 at block 308. This source operand B could be the result of a previous execute operation (e.g., the load-execute instruction could be dependent on a previous operation in the program stream) or this source operand B could have been previously loaded from the memory hierarchy. Alternatively, source operand B could be an immediate/displacement value available from the scheduler queue 128.

The picker 130 continuously monitors the scheduler queue 128 to identify those operations ready for execution. In this example, the execute operation is ready to execute once the source operands A and B are available. Accordingly, in response to the picker 130 determining at block 310 that the source operands A and B are ready, at block 312 the picker 130 issues the execute operation to the EX unit 122 and the register bypass network 134 provides the operands A and B to the EX unit 122, either by initiating PRF reads for these operands from physical registers Pr1 and Pr2, respectively, or by accessing one or both of these operands from the bypass latches 210 and 212 if available. The EX unit 122 then performs the execute operation using the operands A and B during cycle N to generate a result C. For example, using the ADD rax, [mem], whereby rax=operand A and [mem]=operand B, the result C of this load-execute operation would be C=A+B.

At block 314 the result C is latched at the level 0 bypass latch 210 for the cycle N+1 following the execution cycle of the execute operation. At block 316, the result C is then latched at the level 1 bypass latch 212 for the cycle N+2. This latching process of the result C may continue for the n bypass levels need to buffer the result C until it can be written to the PRF 132 upon qualification as valid data. In the example processor pipeline architectures described herein, this qualification takes two cycles and thus there are two bypass levels, although in other implementations the qualification may take more than two cycles and thus utilize more than two bypass levels.

Concurrently with the multi-cycle latching of the result C, at block 318 the writeback unit 204 evaluates the result to qualify its status as valid/invalid. The status of the result may be evaluated using any of a variety of techniques, such as, for example, a parity check. Upon determining the status of the result C, the writeback unit 204 writes a status indicator of the result C to the entry of the status queue 202 corresponding to the load-execute operation.

Concurrently with the multi-cycle latching of the result C, at block 318 the writeback unit 204 evaluates the result to qualify its status as valid/invalid. The status of the result may be evaluated using any of a variety of techniques, such as, for example, a parity check. Upon determining the status of the result C, the writeback unit 204 writes a status indicator of the result C to the entry of the status queue 202 corresponding to the load-execute operation.

At block 320, the logic of the status queue 202 assesses the status of the result C to determine whether the result C is valid. In response to determining the result C is valid, at block 322 logic of the status queue 202 causes the assertion of the write enable signal WRITE_EN for the read port coupled to the latch holding the result C, thereby enabling the PRF write for the result C to proceed to the destination register Pr1 in the PRF 132. Otherwise, if logic of the status queue 202 determines from the status indicator that the result C is invalid (e.g., due to an error in performance of the execute operation or due to bad data for operand A or operand B), at block 324 the status queue 202 maintains the write enable signal WRITE_EN in an unasserted state to continue to suppress the PRF write to destination register Pr1 so that the bad data of result C does not overwrite the load data currently in the register Pr1 in the PRF 132. The status queue 202 also can initiate one or more processes that attempt to recover, such as by initiating a replay of a sequence of operations leading up to the load-execute operation in an attempt to correct the problem that resulted in the bad data.

Figure 4:
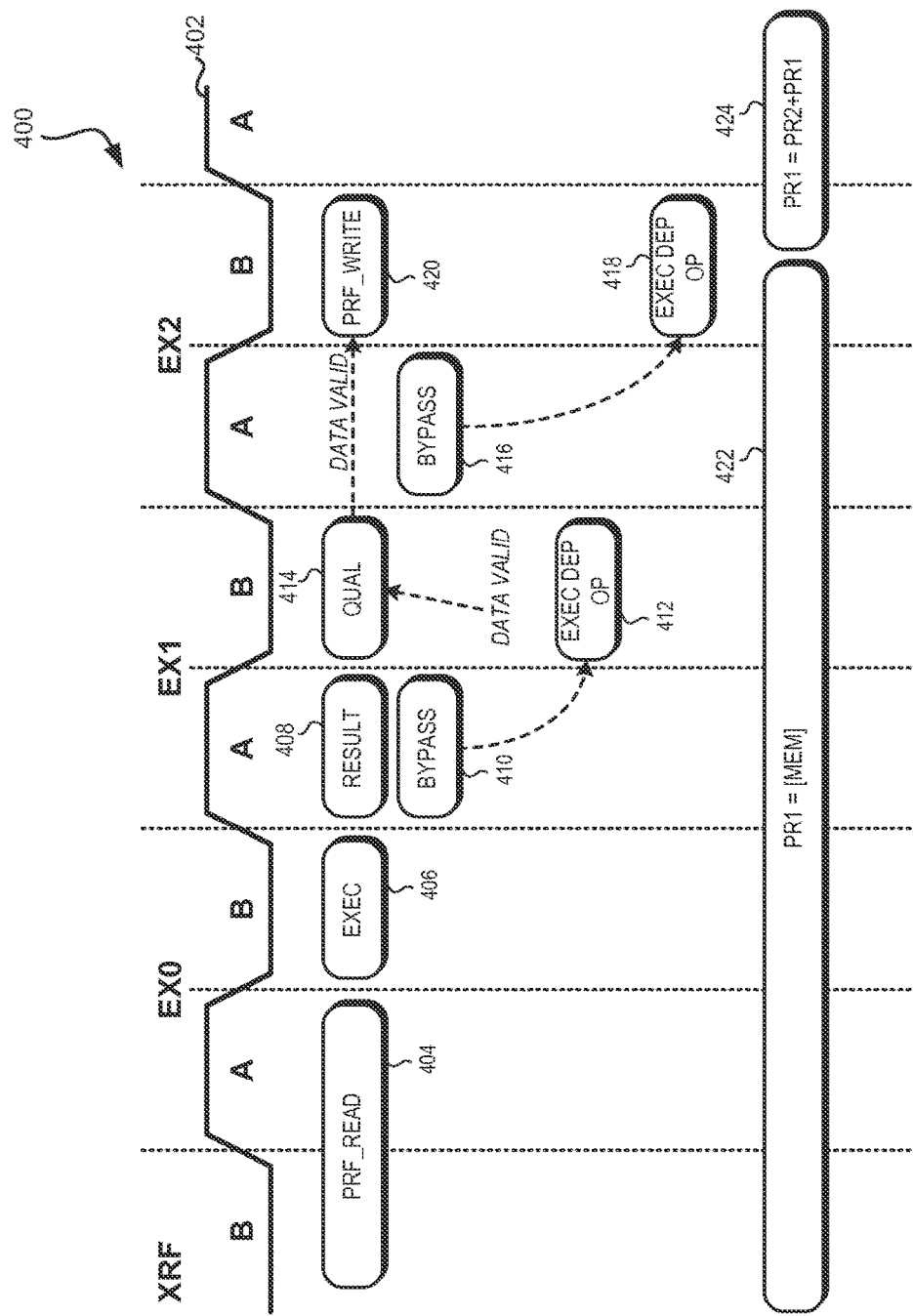
FIG. 4 is a diagram illustrating pipeline stages during execution of a load-execute operation using a single physical register with a valid result in accordance with some embodiments.

FIG. 4 illustrates pipeline stage timing 400 for a scenario whereby the result of the load-execute operation qualifies as valid data and thus is permitted to write to the PRF 132 in accordance with some embodiments. In this example, the pipeline 102 is driven by a clock signal 402, whereby the first and second phases of each cycle of the clock signal 402 are referred to as the "A" phase and "B" phase, respectively. At the B phase of a PRF read (PRFR) stage of the pipeline, a PRF read (404) is initiated to obtain one or both of the operands A and B used by the execute operation component of the load-execute operation, as described above. By the end of phase A of the following EX0 stage, the operands A and B are available to the EX unit 122 and thus the execute operation is executed (406) at phase B of the EX0 stage using operands A and B.

The result C of the execute operation (406) is available (408) at the start of phase A of the following EX1 stage, and thus in phase A of the EX1 stage the result C is latched (410) at the level 0 bypass latch 210 and made available for bypass to one or more dependent operations. In this example, the result C is a source operand for a first dependent operation and thus the register bypass network 134 routes the result C from the level 0 bypass latch 210 to the EX unit that then executes the dependent operation (412) at phase B of the EX1 stage. Concurrently, the writeback unit 204 qualifies the result and the status of the result C as valid data becomes available (414) in the status queue at phase B of the EX1 stage.

At phase A of the EX2 stage, the result C is latched (416) at the level 1 bypass latch 212 and thus may be provided by the register bypass network 134 to dependent operations during phase A of the EX2 stage. In this example, the result C is a source operand for a second dependent operation and thus the register bypass network 134 routes the result C from the level 1 bypass latch 212 to the EX unit that then executes the dependent operation (418) at phase B of the EX2 stage. Moreover, in the depicted example, the pipeline is architected such that PRF writes occur in the B phases of the clock signal 402. Accordingly, in response to the qualification of the result C as valid data, the status queue 202 asserts the write enable signal WRITE_EN, thereby permitting the PRF write (416) of the result C to the PRF 132 at phase B of the EX2 stage.

Figure 5:
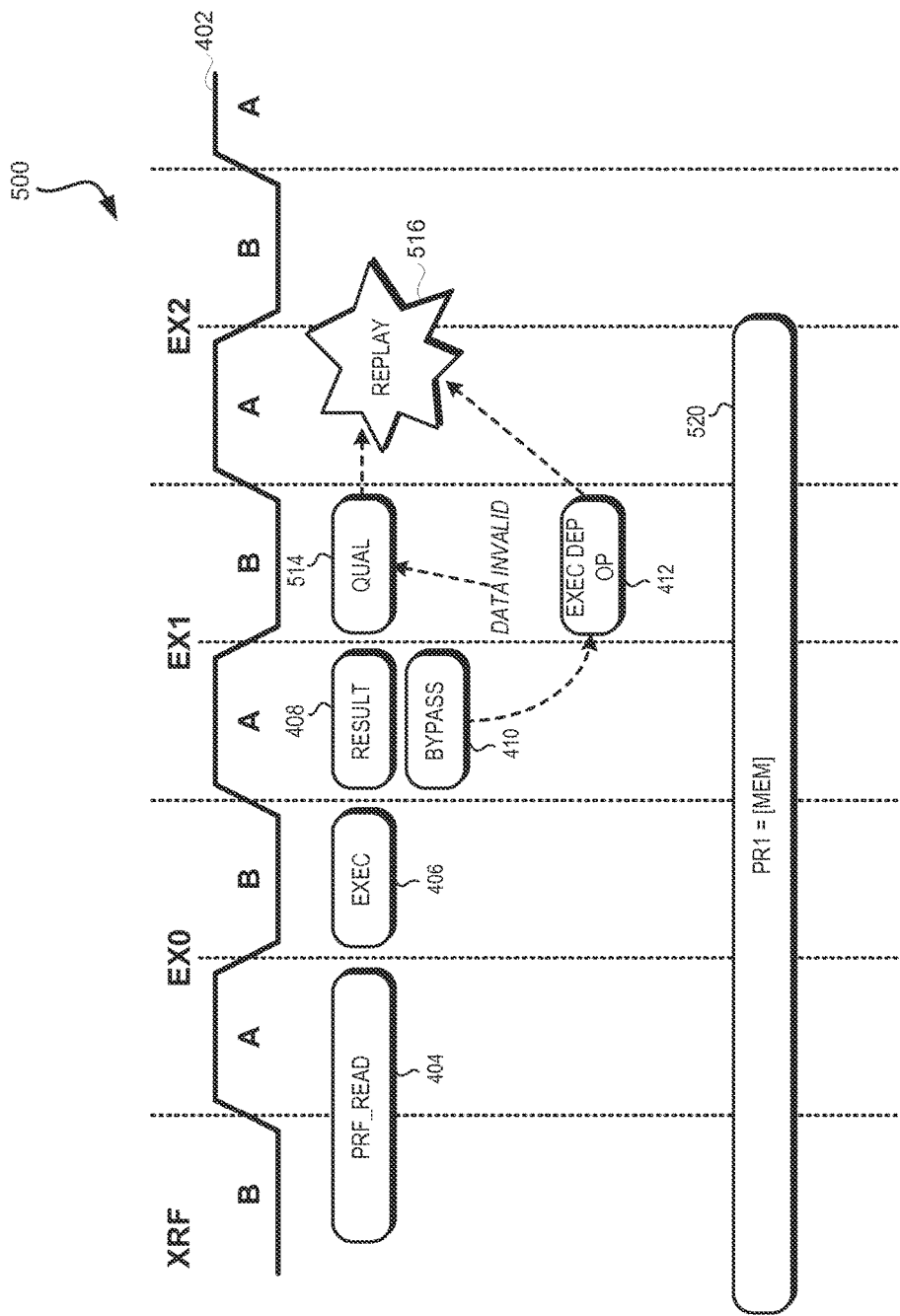
FIG. 5 is a diagram illustrating pipeline stages of a pipeline during execution of a load operation using a single physical register with an invalid result in accordance with some embodiments.

FIG. 5 illustrates pipeline stage timing 500 for a scenario whereby the result of the load-execute operation is bad data and thus the write of the result to the PRF 132 is suppressed in accordance with some embodiments. As with the pipeline stage timing 400, the pipeline stage timing 500 is driven by the clock signal 402. In this scenario, the execution of the load-execute operation proceeds in the same manner described in FIG. 4 until the qualification of the result C in phase B of the EX1 stage. Unlike the scenario of FIG. 4, in this scenario the writeback unit 204 determines the result C is invalid and the status of the result C as bad data thus becomes available (514) in the status queue at phase B of the EX1 stage.

In response to the status of the result C indicating bad data, the status queue 202 suppresses the PRF write of the result C to the PRF 132 and triggers a replay process (516) in an attempt to recover from the bad result. As the dependent operation executed in phase B of stage EX1 executed using bad data, the dependent operation likewise will need to be involved in the replay process.

Blocks 422 and 424 of the pipeline stage timing 400 of FIG. 4 illustrate the contents of the physical register Pr1 in the PRF 132 through the stages PRFR, EX0, EX1, and EX2 for the first scenario whereby the result C is valid data. As depicted by block 422, the physical register Pr1 is loaded with the value stored at memory location [mem] and maintains this value until the result C is qualified as valid data. Once result C is qualified as valid data, as depicted by block 424 the data in the physical register Pr1 is overwritten by the result C (that is, Pr2+Pr1) in phase B of the EX2 stage. Thus, even though the result C is available, the overwriting of the load data in the physical register Pr1 to store result C is delayed until the result C is verified as good, which would have enabled the load data to have been recovered if the result C had not been verified as valid data. Block 520 of the pipeline stage timing 500 of FIG. 5 illustrates the contents of the physical register Pr1 in the PRF 132 through the stages PRFR, EX0, EX1, and EX2 for the second scenario whereby the result C is bad data. As depicted by block 520, the physical register Pr1 is loaded with the value stored at memory location [mem] and maintains this value even after the result C would otherwise be available to write to the PRF 132. As such, the technique of delaying the write of the result of an execute operation to the PRF 132 until after the result qualifies as valid data avoids a situation whereby the load data from a load operation is accidentally overwritten by a bad result.

In some embodiments, at least some of the functionality described above may be implemented by one or more processors executing one or more software programs tangibly stored at a computer readable medium, and whereby the one or more software programs comprise executable instructions that, when executed, manipulate the one or more processors to perform one or more functions described above. Further, in some embodiments, components described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
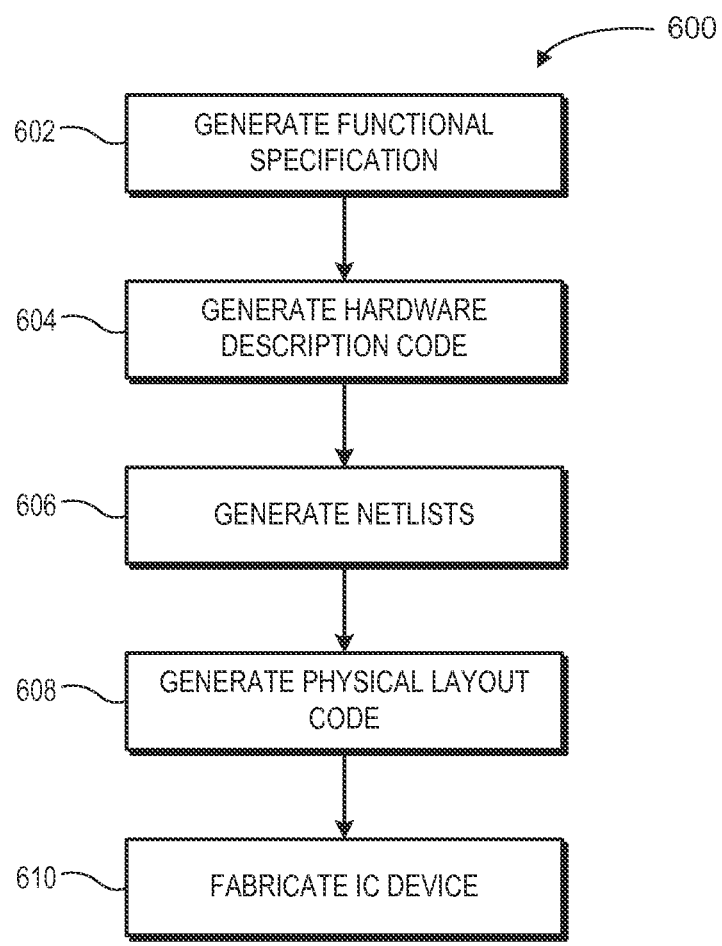
FIG. 6 is a flow diagram illustrating a method for designing and fabricating an integrated circuit device implementing at least a portion of a processor in accordance with some embodiments.

FIG. 6 is a flow diagram illustrating an example method 600 for the design and fabrication of an IC device implementing one or more aspects. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims.

What is claimed is:

1. A processor comprising:
a physical register file comprising a plurality of physical registers;
an execution unit to perform a first operation to generate a result mapped to a physical register of the plurality of physical registers, wherein the processor is to delay a write of the result to the physical register file until the result is determined to be valid data; and
a register bypass network to provide the result as an operand for execution of a subsequent second operation while the result remains unwritten to the physical register file.

2. The processor of claim 1, wherein:
the processor is pipelined to provide a valid status of the result within N clock cycles after the result is generated, N being a positive integer;
the register bypass network comprises a series of N bypass levels, including an initial bypass level to provide the result as an operand for a first clock cycle following the generation of the result and a final bypass level to provide the result as an operand for an Nth clock cycle after the generation of the result; and
wherein the write of the result to the physical register file is performed from the final bypass level.

3. The processor of claim 1, wherein the processor is to delay the write of the result to the physical register file by:
enabling the write to the physical register file responsive to a status qualifying the result as valid data; and
suppressing the write to the physical register file responsive to a status qualifying the result as invalid data.

4. The processor of claim 3, wherein the processor further is configured to initiate a replay process for one or more operations preceding the first operation in a program order responsive to the status qualifying the result as invalid data.

5. The processor of claim 1, further comprising:
a decode unit to decode a load-execute operation into a second operation and the first operation, the second operation comprising a load operation and the first operation using a load data resulting from the load operation as a source operand; and
a map unit to map a load register used to store the load data for the load operation and a destination register of the first operation to the physical register.

6. The processor of claim 5, wherein the second operation and the first operation comprise micro-operations.

7. The processor of claim 5, wherein the processor is to permit a write of the load data to the physical register in the physical register file without first determining whether the load data is valid data.

8. A method comprising:
performing a first operation in a processor to generate a result mapped to a physical register of a plurality of physical registers of a physical register file in the processor; and
delaying a write of the result to the physical register file until the result is determined to be valid data; and
providing, via a register bypass network in the processor, the result as an operand for execution of a subsequent operation while the result remains unwritten to the physical register file.

9. The method of claim 8, wherein:
the processor is pipelined to provide a valid status of the result within N clock cycles after the result is generated, N comprising a positive integer; and
providing the result as an operand comprises:
providing the result as an operand for a first clock cycle following the generation of the result; and
providing the result as an operand for a second clock cycle following the first clock cycle.

10. The method of claim 8, wherein delaying a write of the result to the physical register file comprises:
enabling the write to the physical register file responsive to a status qualifying the result as valid data; and
suppressing the write to the physical register file responsive to a status qualifying the result as invalid data.

11. The method of claim 10, further comprising:
initiating a replay process for one or more operations preceding the first operation in a program order responsive to the status qualifying the result as invalid data.

12. The method of claim 8, further comprising:
decoding a load-execute operation into a second operation and the first operation, the second operation comprising a load operation and the first operation using a load data resulting from the load operation as a source operand; and
mapping a load register used to store the load data for the load operation and a destination register of the operation to the physical register.

13. The method of claim 12, wherein the first operation and second operation comprise micro-operations.

14. The method of claim 12, further comprising:
permitting a write of the load data to the physical register in the physical register file without first determining whether the load data is valid data.

15. A method comprising:
mapping a physical register of a physical register file in a processor both to store a load data of a load operation of a load-execute operation and to subsequently store a result of an execute operation of the load-execute operation;
writing the load data in the physical register of the physical register file;
in a first clock cycle of the processor, executing the execute operation to generate the result subsequent to writing the load data;
in a second clock cycle after the first clock cycle, providing the result as a source operand for execution of a first dependent operation; and
in a third clock cycle after the second clock cycle, enabling a write of the result to the physical register of the physical register file responsive to the result being valid.

16. A non-transitory computer readable medium embodying a set of executable instructions, the set of executable instructions to manipulate a computer system perform a portion of a process to fabricate at least part of a processor, the processor comprising:
a physical register file comprising a plurality of physical registers;
an execution unit to perform a first operation to generate a result mapped to a physical register of the plurality of physical registers, wherein the processor is to delay a write of the result to the physical register file until the result is determined to be valid data; and
a register bypass network to provide the result as an operand for execution of a subsequent second operation while the result remains unwritten to the physical register file.

17. The computer readable medium of claim 16, wherein the processor is to delay the write of the result to the physical register file by:
enabling the write to the physical register file responsive to a status qualifying the result as valid data; and
suppressing the write to the physical register file responsive to a status qualifying the result as invalid data.

18. The computer readable medium of claim 16, wherein the processor further comprises:
a decode unit to decode a load-execute operation into a second operation and the first operation, the second operation comprising a load operation and the first operation using a load data resulting from the load operation as a source operand; and
a map unit to map a load register used to store the load data for the load operation and a destination register of the first operation to the physical register.

19. The computer readable medium of claim 18, wherein the processor is configured to permit a write of the load data to the physical register in the physical register file without first determining whether the load data is valid data.

* * * * *